United States Patent
Li et al.

(10) Patent No.: US 11,822,616 B2
(45) Date of Patent: *Nov. 21, 2023

(54) METHOD AND APPARATUS FOR PERFORMING OPERATION OF CONVOLUTIONAL LAYERS IN CONVOLUTIONAL NEURAL NETWORK

(71) Applicant: Nanjing Horizon Robotics Technology Co., Ltd., Nanjing (CN)

(72) Inventors: Delin Li, Beijing (CN); Kun Ling, Beijing (CN); Liang Chen, Beijing (CN); Jianjun Li, Beijing (CN)

(73) Assignee: Nanjing Horizon Robotics Technology Co., Ltd., Nanjing (CN)

( * ) Notice: Subject to any disclaimer, the term of this patent is extended or adjusted under 35 U.S.C. 154(b) by 1394 days.

This patent is subject to a terminal disclaimer.

(21) Appl. No.: 16/203,031

(22) Filed: Nov. 28, 2018

(65) Prior Publication Data

US 2019/0163716 A1 May 30, 2019

(30) Foreign Application Priority Data

Nov. 28, 2017 (CN) .......................... 201711212061.4

(51) Int. Cl.
*G06N 3/063* (2023.01)
*G06N 3/08* (2023.01)
(Continued)

(52) U.S. Cl.
CPC .............. *G06F 17/15* (2013.01); *G06F 7/501* (2013.01); *G06F 7/523* (2013.01); *G06N 3/045* (2023.01);
(Continued)

(58) Field of Classification Search
CPC .......... G06F 17/15; G06F 7/501; G06F 7/523; G06N 20/10; G06N 3/0454; G06N 3/063; G06N 3/08
See application file for complete search history.

(56) References Cited

U.S. PATENT DOCUMENTS 5,745,872 A    4/1998  Kema
10,073,816 B1 *  9/2018  Lu .......................... G06N 3/063
(Continued)

FOREIGN PATENT DOCUMENTS

CN      106447030 A      2/2017
DE  202017104127 U1     10/2017
(Continued)

OTHER PUBLICATIONS

Du et al. (A streaming accelerator for deep convolutional neural networks with image and feature decomposition for resource-limited system applications. arXiv preprint arXiv:1709.05116 (Sep. 2017)) (Year: 2017).*

(Continued)

*Primary Examiner* — Li B. Zhen
*Assistant Examiner* — Moriam Mosunmola Godo
(74) *Attorney, Agent, or Firm* — K&L Gates LLP

(57) ABSTRACT

Disclosed are a method and an apparatus for performing an operation of a convolutional layer in a convolutional neural network. The method comprises: reading unfolded feature data provided to the convolution layer and an original convolution kernel of the convolutional layer from a dynamic random access memory (DRAM); folding the unfolded feature data in at least one dimension of width and height to generate folded feature data; pre-processing the folded feature data and the original convolution kernel; storing the pre-processed folded feature data into a static random-access memory (SRAM); folding the pre-processed (Continued)

original convolution kernel in the at least one dimension to generate one or more folded convolution kernels corresponding to the original convolution kernel; storing the one or more folded convolution kernels in the SRAM; and reading the pre-processed folded feature data and the one or more folded convolution kernels from the SRAM into a calculation unit for convolving the pre-processed folded feature data with the one or more folded convolution kernels. By means of the method and/or apparatus in accordance with embodiments of the present disclosure, channel utilization may be improved, cache occupancy may be reduced, and operation efficiency may be improved.

18 Claims, 10 Drawing Sheets

(51) Int. Cl.
*G06F 17/15* (2006.01)
*G06N 3/045* (2023.01)
*G06N 20/10* (2019.01)
*G06F 7/501* (2006.01)
*G06F 7/523* (2006.01)

(52) U.S. Cl.
CPC .............. *G06N 3/063* (2013.01); *G06N 3/08* (2013.01); *G06N 20/10* (2019.01)

(56) References Cited

U.S. PATENT DOCUMENTS

2016/0358099 A1  12/2016  Sturlaugson
2018/0018554 A1*  1/2018  Young ................... G06N 3/063

FOREIGN PATENT DOCUMENTS

| JP | 1069290 A | 3/1998 |
| JP | 200885544 A | 4/2008 |
| JP | 20174509 A | 1/2017 |
| JP | 2017525038 A | 8/2017 |
| WO | 03060748 A2 | 7/2003 |
| WO | 2016010922 A1 | 1/2016 |
| WO | 2018013809 A1 | 1/2018 |

OTHER PUBLICATIONS

Japanese Office Action (including English translation) for App. No. JP2018-221331, dated May 26, 2020, 9 pages.
Aravind Vasudevan et al: "Parallel Multi Channel convolution using General Matrix Multiplication", 2017 IEEE 28th International Conference on Application-Specific Systems, Architectures and Processors (ASAP), Jul. 3, 2017 (Jul. 3, 2017), pp. 19-24, XP055569367, DOI: 10.1109/ASAP.2017.7995254, ISBN: 978-1-5090-4825-0.
Extended European Search Report for Application No. 18208757.7, dated Mar. 27, 2019, 13 pages.
Qiang Lan et al: "High Performance Implementation of 3D Convolutional Neural Networks on a GPU", Computational Intelligence and Neuroscience, vol. 2017, Nov. 8, 2017 (Nov. 8, 2017), pp. 1-8, XP055568904, US ISSN: 1687-5265, DOI: 10.1155/2017/8348671.
Xiaoming Chen et al: "Optimizing Memory Efficiency for Convolution Kernels on Kepler GPUs", arxiv.org, Cornell University Library, 201 Olin Library Cornell University Ithaca, NY 14853, May 29, 2017 (May 29, 2017), XP080766540, DOI: 10.1145/3061639.3062297 (6 pages).
Yuan Du et al: "A Streaming Accelerator for Deep Convolutional Neural Networks with Image and Feature Decomposition for Resource-limited System Applications", Sep. 15, 2017 (Sep. 15, 2017), XP055569322, Retrieved from the Internet: URL:https://arxiv.org/ftp/arxiv/papers/1709/1709.05116.pdf [retrieved on Mar. 14, 2019](5 pages).

* cited by examiner

METHOD AND APPARATUS FOR PERFORMING OPERATION OF CONVOLUTIONAL LAYERS IN CONVOLUTIONAL NEURAL NETWORK

TECHNICAL FIELD OF THE DISCLOSURE

The present disclosure generally relates to a technical field of convolutional neural network, and more particularly, to a method and an apparatus for performing an operation of a convolutional layer in a convolutional neural network.

BACKGROUND

Deep learning technology based on convolutional neural network has already been widely used in various fields such as image recognition, video analysis, natural language processing, auxiliary driving and the like. The convolutional neural network is usually operation intensive, and it is desired that operations in the convolutional neural network can be efficiently performed by using hardware such as a general purpose central processor (CPU), a graphics processor (GPU), or a dedicated accelerator, and the like.

SUMMARY

In one aspect, disclosed is a method for performing m operation of a convolutional layer in a convolutional neural network comprising: reading unfolded feature data provided to the convolution layer and an original convolution kernel of the convolutional layer from a dynamic random access memory (DRAM); folding the unfolded feature data in at least one dimension of width and height to generate folded feature data; pre-processing the folded feature data and the original convolution kernel; storing the pre-processed folded feature data into a static random-access memory (SRAM); folding the pre-processed original convolution kernel in at least one dimension to generate one or more folded convolution kernels corresponding to the original convolution kernel; storing the one or more folded convolution kernels in the SRAM; and reading the pre-processed folded feature data and the one or more folded convolution kernels from the SRAM into a calculation unit for convolving the pre-processed folded feature data using the generated one or more folded convolution kernels.

In another aspect, further disclosed is an apparatus for performing an operation in a convolutional layer in a convolutional neural network, comprising one or more processors configured to execute instructions, execution of the instructions causing the one or more processors to perform following steps: reading unfolded feature data provided to the convolution layer and an original convolution kernel of the convolutional layer from a dynamic random access memory (DRAM); folding the unfolded feature data in at least one dimension of width and height to generate folded feature data; pre-processing the folded feature data and the original convolution kernel; storing the pre-processed folded feature data into a static random-access memory (SRAM); folding the pre-processed original convolution kernel in at least one dimension to generate one or more folded convolution kernels corresponding to the original convolution kernel; storing the one or more folded convolution kernels in the SRAM; and reading the pre-processed folded feature data and the one or more folded convolution kernels from the SRAM into a calculation unit for convolving the pre-processed folded feature data using the generated one or more folded convolution kernels.

In another aspect, further disclosed is an apparatus for performing an operation of a convolutional layer in a convolutional neural network, comprising: a first folding unit configured to fold unfolded feature data provided to the convolutional layer in at least one dimension of width and height to generate folded feature data; a pre-processing unit configured to pre-process the folded feature data and an original convolution kernel of the convolutional layer; a second folding unit configured to fold the pre-processed original convolution kernel in at least one dimension to generate one or more folded convolution kernels corresponding to the original convolution kernel; and an arithmetic unit configured to convolve the pre-processed folded feature data using one or more folded convolution kernels.

Further, the present disclosure provides a non-temporary storage medium having program instructions stored thereon for executing following steps when executed by a computing device: reading unfolded feature data provided to the convolution layer and an original convolution kernel of the convolutional layer from a dynamic random access memory (DRAM); folding the unfolded feature data in at least one dimension of width and height to generate folded feature data; pre-processing the folded feature data and the original convolution kernel; storing the pre-processed folded feature data into a static random-access memory (SRAM); folding the pre-processed original convolution kernel in at least one dimension to generate one or more folded convolution kernels corresponding to the original convolution kernel; storing the one or more folded convolution kernels in the SRAM; and reading the pre-processed folded feature data and the one or more folded convolution kernels from the SRAM into a calculation unit for convolving the pre-processed folded feature data using the generated one or more folded convolution kernels.

By means of the method and/or apparatus in accordance with embodiments of the present disclosure, channel utilization may be improved, cache occupancy may be reduced, and operation efficiency may be improved.

DETAILED DESCRIPTION

Figure 1:
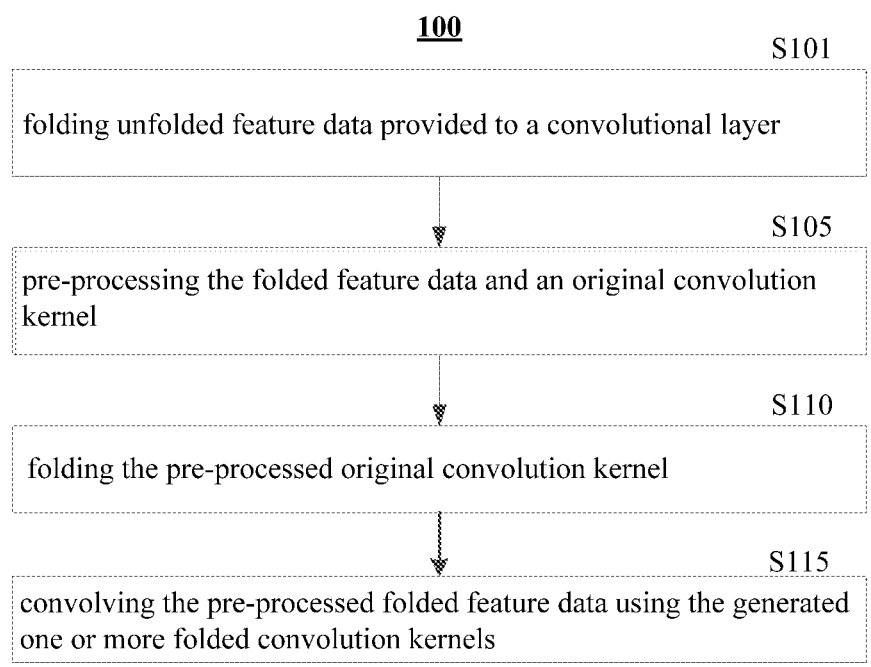
FIG. 1 illustrates a flow chart of a method for performing an operation in a convolutional layer in a convolutional neural network according to an embodiment of the present disclosure.

A feature data provided to a convolutional neural network may be regarded as a data cube that has a plurality of dimensions (i.e. different channels), such as width, height, and depth, and the like, and each single data in the feature data may correspond to one point in the data cube. Each convolution kernel including weight parameters for the convolution operation in the convolutional neural network may also be regarded as a data cube.

Usually, the term "slice" is used when describing a data cube, when three dimensions of a data cube are considered to correspond to the dimensions indicated by X-axis, Y-axis, and Z-axis in a three-dimensional Cartesian coordinate system, respectively, a slice of the data cube in a first dimension corresponding to the dimension indicated by the X-axis indicates a result obtained by sampling the data in the data cube using a plane-orthogonal to the X-axis, which is a rectangular data in a two-dimensional plane indicated by the Y-axis and the Z-axis. Formulaically, if a data cube is regarded as a set of points Cube=$\{(x, y, z)|x \in [0,W), y \in [0, H), x \in [0,D)\}$, where W, H, and D are integers greater than 0, a slice of the data cube in the first dimension corresponding to the dimension indicated by the X-axis Slice$_i$=$\{(y, z)|x=i, y \in [0, H), x \in [0, D)\}$, where $i \in [0, W)$. A slice in which all data are zero (or equivalent to zero) may be referred to as a zero slice.

In addition, the term "pixel" is also usually used to describe the data cube. A pixel of the data cube includes points in the data cube that have the same width (X) and height (Y) coordinates and it may be represented as Pixel$_{ij}$=$\{(z)|x=i, y=j, z \in [0, D)\}$, where $i \in [0, W)$ and $j \in [0, H)$. As seen, a slice may include a plurality of pixels.

Herein, for the convenience, the term "slice" is also used when describing data of a feature data or of a convolution kernel in a certain dimension, for example, a slice in the width dimension (also referred to as a "width slice" for short), a slice in the height dimension (also referred to as a "height slice" for short), etc.

Herein, when padding or appending one or more zero slices in a first dimension (e.g. a width dimension) of a data cube A, it may mean that the dimension value (e.g. width) of the first dimension of the data cube A is increased by adding one or more zero slices at a certain boundary in the first dimension (e.g. a left or right side in the width dimension) of the data cube A, each added zero slice has the same dimension value (e.g. a height value and a depth value) as the original data cube A in the other two dimensions (e.g. the height and depth dimensions).

Herein, when padding or appending one or more zero slices in a first dimension and a second dimension (e.g. both a width dimension and a height dimension) of the data cube A, it may mean that a dimension value (e.g. width) of the first dimension of the data cube A is increased by adding one or more zero slices at a certain boundary in the first dimension (e.g. a left side or right side in the width dimension) of the data cube A, each added zero slice has the same dimension values (e.g. a height value and a depth value) as those of the original data cube A in the other two dimensions (e.g. both the height dimension and depth dimension), and then one or more zero slices are added at a certain boundary (e.g. an upper side or a lower side in the height dimension) in the second dimension of the data cube A' resulting from increasing the width dimension in order to increase the second dimension value (such as height) of the data cube A', each added zero slice has the same dimension values (e.g. a width value and a depth value) as those of the data cube A in the other two dimensions (e.g. both the width dimension and the depth dimension).

Herein, when it is mentioned that each slice of the data cube A is aligned in depth, it may mean that zero (or a value equivalent to zero) is added in depth to a slice of the data cube A (e.g. a width slice or a height slice) without desired depth value, such that the added slices of the data cube A each have the desired depth value.

Herein, when the padding is performed in the first dimension and/or the second dimension of the data cube A, a number of the padded zero slices may be zero or one or more, unless otherwise specified.

The convolutional neural network is usually operation intensive, and it is desirable to efficiently perform operations in the convolutional neural network by using hardware such as a general purpose central processor, a graphics processor, or a dedicated accelerator, and the like. In order to improve operation efficiency and/or simplify a hardware design, for example, a multi-channel memory may be designed to provide data to an adder and/or a multiplier performing convolution operation, or an arithmetic unit may be designed to support a multi-channel operation.

Generally, a feature data provided to an input layer of the convolutional neural network may have a small number of channels (usually 3 channels or just 1 channel), and an input feature data to a convolutional layer of the convolution neural network relatively preceding in a feedforward reasoning direction may also have a small number of channels. Zero slices may be added to the feature data and a corresponding convolution kernel in depth or channel dimension to align the channels, causing low resource utilization of the hardware, such as a cache and/or multiplier and many invalided operations.

FIG. 1 illustrates an exemplary method 100 for performing an operation of a convolutional layer in a convolutional neural network according to an embodiment of the present disclosure, comprising:

Step S101, folding unfolded feature data provided to a convolutional layer in at least one dimension of width and height to generate folded feature data;

Step S105, pre-processing the folded feature data and an original convolution kernel of the convolutional layer;

Step S110, folding the pre-processed original convolution kernel to generate one or more folded convolution kernels corresponding to the original convolution kernel; and Step S115, convolving the pre-processed folded feature data using the generated one or more folded convolution kernels.

By means of the method according to an embodiment of the present disclosure, at least the hardware design may be simplified, the utilization of channel or hardware resources may be improved, and/or the parallelism of operation may be improved.

As shown in FIG. 1, an exemplary method 100 for performing an operation of a convolutional layer in a convolutional neural network according to an embodiment of the present disclosure may start at step S101 to fold unfolded feature data provided to the convolutional layer in at least one dimension of width and height.

In one embodiment, unfolded original feature data FD provided to a convolutional layer may be folded in one dimension D1 of width and height to generate FD' by splicing every $N_x$ (also referred to herein as the number of splicing in the dimension D1, splicing number for short in a case where the context is clear) consecutive slices of the unfolded original feature data FD in the dimension D1 together in depth, such that data of all $C_x$ channels in the $(i_{fx} \times N_x + j_{fx})$th slice of the unfolded original feature data FD in the dimension D1 correspond to data of consecutive $C_x$ channels starting from the $(j_{fx} \times C_x)$th channel in the $(i_{fx})$th slice of FD' in the dimension D1, where $N_x$ is an integer greater than 1, $i_{fx}$ is an integer greater than or equal to 0, $j_{fx}$ is an integer greater than or equal to 0 and less than $N_x$, and $C_x$ is an integer greater than 0.

In another embodiment, after obtaining FD', FD' is folded in the other dimension D2 of width and height to generate FD" by splicing every $N_y$ (also referred to herein as the number of splicing in the dimension D2, splicing number for short in a case where the context is clear) consecutive slices of FD' in the dimension D2 together in depth, such that data of all $C_y$ channels in the $(i_{fy} \times N_y + j_{fy})$th slice of FD' in the dimension D2 correspond to data of consecutive $C_y$ channels starting from the $(j_{fy} \times C_y)$th channel in the $(i_{fy})$th slice of FD" in the dimension D2, where $N_y$ is an integer greater than 1, $i_{fy}$ is an integer greater than or equal to 0, $j_{fy}$ is an integer greater than or equal to 0 and less than $N_y$, and $C_y$ is an integer greater than 0.

Figure 2:
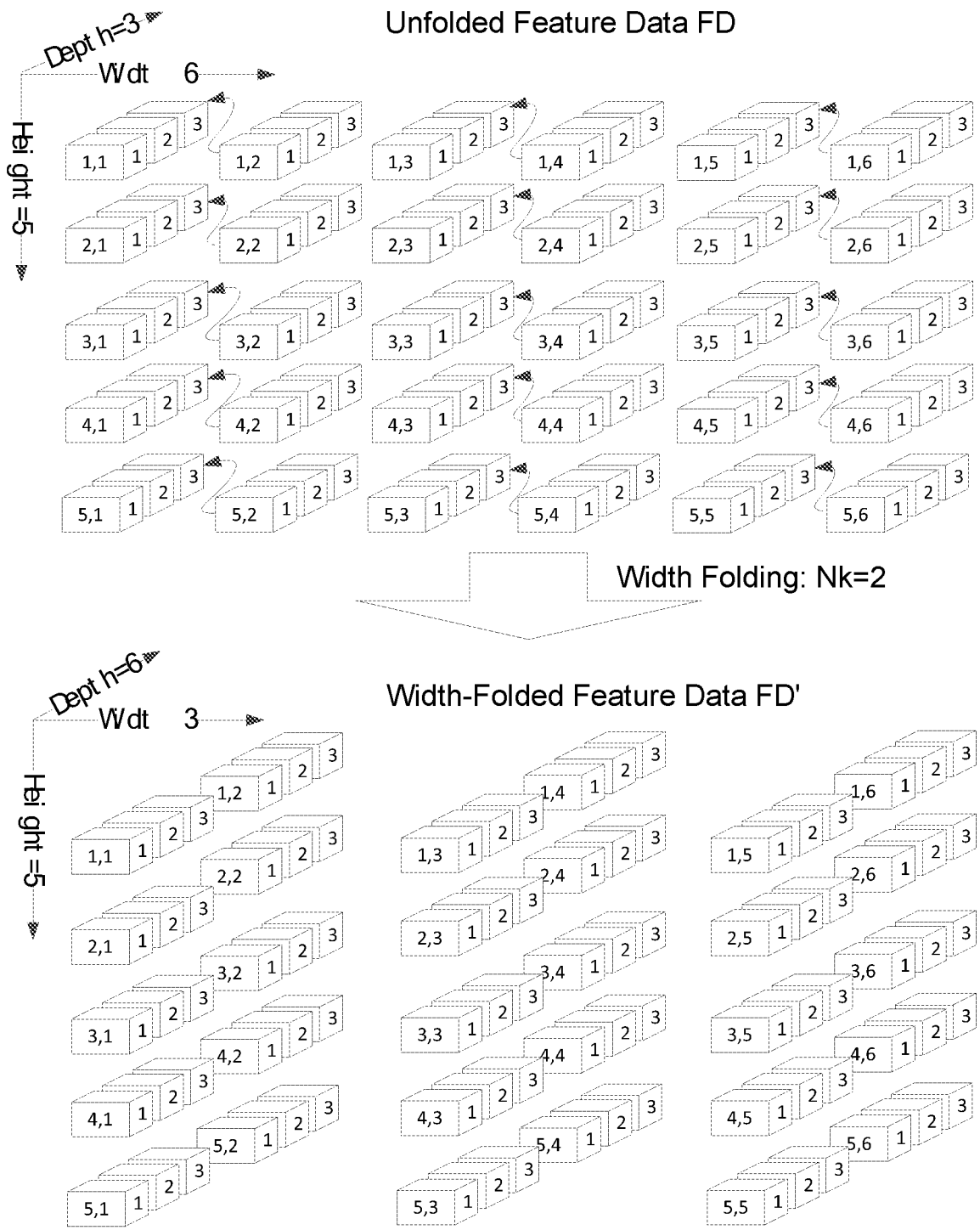
FIG. 2 illustrates an example of folding unfolded feature data in one dimension according to an embodiment of the present disclosure.

FIG. 2 shows an example of folding an original feature data FD with width 6, height 5 and depth 3 provided to a convolutional layer in width. In FIG. 2, each small cube indicates one data value in the unfolded feature data FD (e.g. a pixel value of one color in an RGB image). A front surface of each small cube is labeled with coordinate values in width and height dimensions in a form of "x, y", and a side surface is labeled with a channel number of the data value indicated by a small cube in the feature data FD. For example, a label "1, 1" on a front surface of a small cube indicates that the small cube is located in the first row in the height dimension and the first column in the width dimension in the feature data FD. Further, a label "1" on a side surface of the small cube indicates that the small cute locates in the first level in the depth (or channel) dimension in the feature data FD. All of the small cubes constitute unfolded feature data FD containing 6 width slices, i.e. all small cubes in the first column of the feature data FD (y=1), all small cubes in the second column of the feature data FD (y=2), all small cubes in the third column of the feature data FD (y=3), all small cubes in the fourth column of the feature data FD (y=4), all small cubes in the fifth column of the feature data FD (y=5) and all small cubes in the column 6 of the FD (y=6).

In the example of FIG. 2, every 2 slices ($N_x$=2) of the feature data FD in width dimension are spliced together in depth dimension, by splicing the width slice of the second column in depth to the ending of the width slice of the first column, splicing the width slice of the fourth column in depth to the ending of the width slice of the third column, and splicing the width slice of the sixth column in depth to the ending of the width slice of the fifth column, such that the feature data FD is folded in width to generate folded width feature data FD'. As shown in FIG. 2, for example, the data in the width slice of the second column in the feature data FD correspond to the data in the fourth channel to the sixth channel in the width slice of the first column in the feature data FD'.

As shown in FIG. 2, compared with the feature data FD, the height of the feature data FD' is unchanged, but the width is reduced and the depth is doubled, thereby it may be allowed to increase utilization of a channel and at least reduce the amount of operation in width.

Herein, as shown in FIG. 2, each small cube in an image generated by folding a feature data is not renumbered, in order to clearly depict correspondence between slices in the folded feature data (as well as the convolution kernel described below) and the unfolded feature data. In addition, if it is clear in the context, the small cubes in the feature data (and the convolution kernel described below) may not be shown, rather a plane may be used to indicate a slice. For example, if three dimensions of width, height, and depth correspond to X-axis, Y-axis, and Z-axis in the three-dimensional Cartesian coordinate system, respectively, a plane perpendicular to the X-axis may be used to indicate a width slice of the feature data (or the convolution kernel described below).

Figure 3:
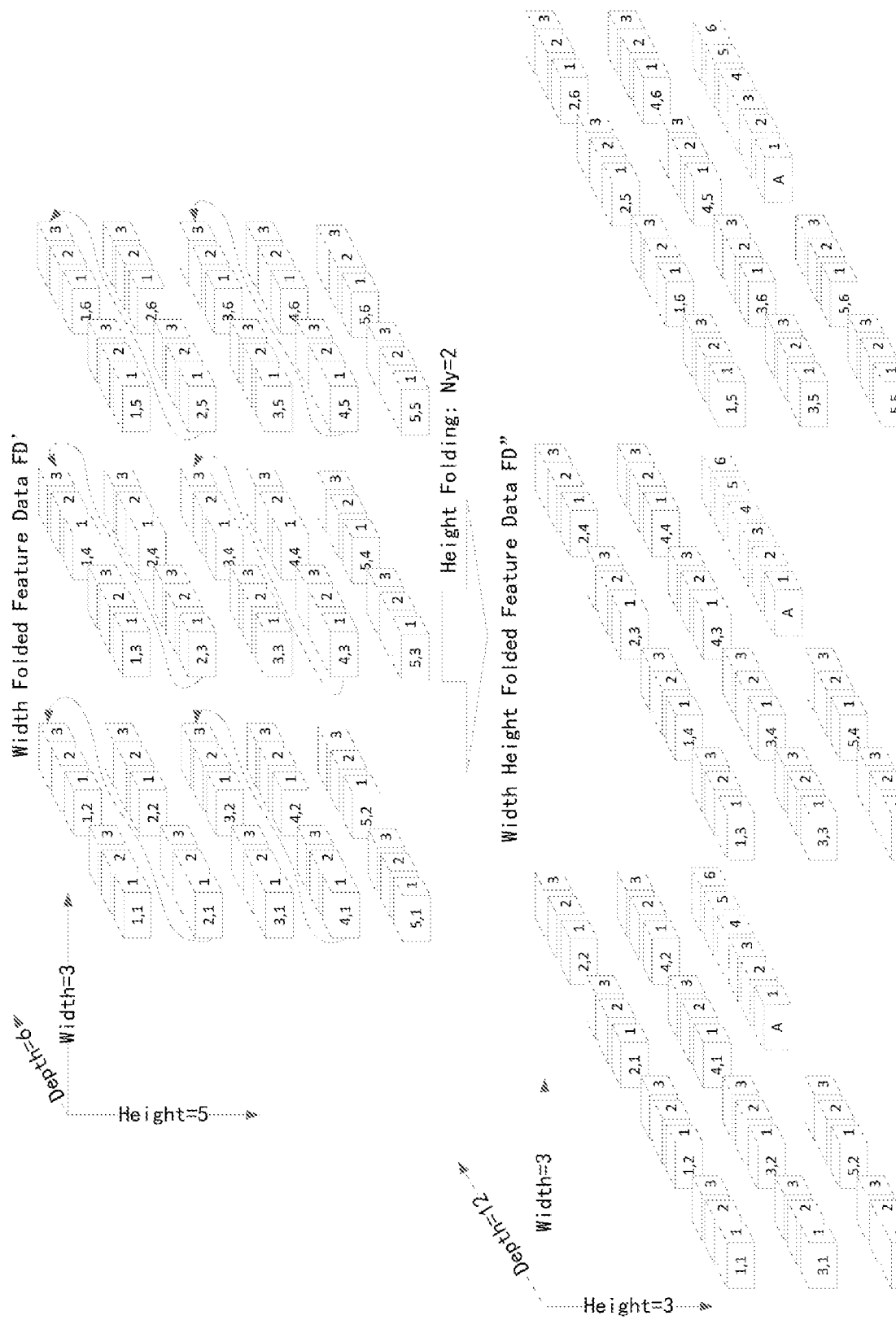
FIG. 3 illustrates an example of folding unfolded feature data in two dimensions according to an embodiment of the present disclosure.

FIG. 3 shows an example in which the width folded feature data FD' of FIG. 2 is further to be folded in depth. In the example of FIG. 3, the second slice ($N_y$=2) of FD' in height is spliced together in depth by splicing the height slice of the second row in depth to the ending of the height slice of the first row and splicing the height slice of the fourth row in depth to the ending of the height slice of the third row, such that the feature data FD' is folded in height to generate a height folded feature data FD'. As shown in FIG. 3, for example, the data in the height slice of the fourth column in the width folded feature data FD' correspond to the data in the seventh channel to the twelfth channel in the width slice of the second row of the height folded feature data FD".

As shown in FIG. 3, during folding, no additional height slices in the width folded feature data FD' can be spliced to the rear of the height slice of the fifth row, i.e. no additional height slices in FD' can be spliced in depth with the height slice of the fifth row in the width folded feature data FD', such that each generated height slice in the height folded feature data FD" is not aligned in depth (or channel).

For such a case, in one embodiment, the total number of height slices in the width folded feature data FD' (i.e. the height of the width folded feature data FD') may be checked before folding, and if the total number is not an integral multiple of $N_y$, one or more zero slices may be firstly appended to the lower side (i.e. at the ending boundary in height) of the width folded feature data FD' (not shown in FIG. 3), such that the total number of height slices in the width folded feature data FD' becomes an integral multiple of $N_y$. The number of appended zero slices may be smaller than slicing times.

In other embodiments, during folding, for the last height slice in the width folded feature data FD' (i.e. the slice of the fifth row), it may be determined whether it is still necessary to splice in depth based on the slice. If so, for example, for a slice such as a slice of the fifth row in the width folded feature data FD', additional one or more zero slices (such as slices indicated by each dotted cubes A in the height folded feature data FD" in FIG. 3) may be continuously used to splice in depth with the slice.

In other embodiments, the additional one or more zero slices (such as slices indicated by each dotted cubes A in the height folded feature data FD" in FIG. 3) may be added to the height folded feature data FD", such that the channels of each height slice in the added height folded feature data FD" are aligned.

In other embodiments, the property or processing capacity of the hardware (such as an arithmetic unit or memory supporting multi-channel) may be directly used. For example, if a hardware may have the ability to align channels, a channel without occupied by actual data may be automatically regarded as having a zero value by the hardware. In such a case, channels of each slice in the height folded feature data FD" will be automatically aligned by the hardware. For example, if the hardware supports 32 channels simultaneously, the number of channels in the height folded feature data FD" may be automatically aligned as 32 channels by the hardware.

It should be noted that for folding in width, though not shown in FIG. 2, there is also possible to be inconsistent between the number of channels of the last width slice in the folded feature data and the number of channels of other width slices. Similar to the processing for the feature data FD' and/or FD" in the example of FIG. 3 in width, the padded unfolded feature data or the obtained folded feature data may be processed before or during folding or after folding, or automatically processed by means of property of hardware, such that the channels of each width slice in the finally obtained folded feature data are aligned.

Further, although FIG. 2 illustrates that the FD is folded in width to obtain FD' which is folded in height to obtain FD" illustrated in FIG. 3, in other embodiments, the FD may be folded in height and then folded in width, or may be folded only in width or only in height.

Further, the method according to an embodiment of the present disclosure is not limited to the $N_x$ value shown in FIG. 2 and/or the $N_y$ value shown in FIG. 3. The number of splicing $N_x$ or $N_y$ may be 3, 4 or any other integer greater than 1. In one embodiment, the number of splicing $N_x$ or $N_y$ for a width folding or height folding may be set based on the number of channels supported by the hardware (such as memory or arithmetic unit supporting multi-channel). For example, in a case where the number of channels supported by the hardware is TC, the splicing number $N_x$ in the dimension D1 may be determined to be a certain value less than or equal to $|TC/C_x|$ and greater than 1, wherein "||" indicates a rounding operation. If it is still necessary to continue folding in the dimension D2, the values of $N_x$ and Ny may be selected such that $N_x \times N_y \le |TC/C_x|$, and the values of $N_x$ and $N_y$ are both greater than 1.

After step S101, the exemplary method 100 proceeds to step S115, to pre-process the folded feature data and an original convolution kernel.

In a conventional convolution operation, that is, in a case where the original convolution kernel is used to perform convolution on an original unfolded feature data supplied to a convolutional layer, the original convolution kernel slides on the original unfolded feature data with a stride Sx (greater than or equal to 1) in width and with a stride Sy (greater than or equal to 1) in height, and convolves data of a portion of the original unfolded feature data corresponding to the sliding window. In order to be able to obtain a desired output feature data, before convolving, zero slices may be padded around the two dimensions of width and height (including a starting boundary and an ending boundary in width and a starting boundary and an ending boundary in height) of the original unfolded feature data in a specified padding manner, depended on which the number of padded zero slices may be zero, one or more. For a designed convolutional neural network, weight parameters (including the number of convolution kernels and the width, height, depth, and the included value of each convolution kernel) used in each convolutional layer and the padding manner for the original unfolded feature data provided to the convolutional layer are always known. These settings may be specified in advance by the designer of the convolutional neural network when the convolutional neural network is designed, or may be designed or adjusted by learning.

In order to ensure that the correct desired results may still be obtained by using the method according to an embodiment of the present disclosure, if is necessary to pre-process the folded feature data and the original convolution kernel.

If the original unfolded feature data FD provided to the convolutional layer is folded based on the splicing number $N_x$ in one dimension D1 of width and height and the folded feature data FD' is obtained, the padding quantity $P_1$, $P_1 \ge =0$ to be padded at the starting boundary in the dimension D1 for the feature data FD may be determined according to a padding manner for the feature data FD specified by the convolutional layer. Then, $[P_1/N_x]$ zero slices may be padded at the starting boundary of FD' in the dimension D1, wherein "[ ]" indicates an upward rounding operation.

For the ending boundary of FD' within the dimension D1, the padding quantity $P_2$, $P_2 \ge =0$ to be padded at the ending boundary in the dimension D1 for the feature data FD may be determined according to a padding manner for the feature data FD specified by a convolutional layer. Then, if $P_2 > (FV_x' \times N_x - FV_x)$, $[(P_2 - FV_x' \times N_x + FV_x)/N_x]$ zero slices may be padded at the ending boundary of FD' within the dimension D1, where $FV_x$ and $FV_x'$ indicate dimension values (for example, the width value in a case where D1 is the width) of FD and FD' in the dimension D1, respectively. It may also firstly calculate the dimension value $KVx'=[((N_x/(N_x, S_x)-1) \times S_x + KV_x)/N_x]$ of an expected folded convolution kernel in the dimension D1, where $S_x$ indicates a stride of the original convolution kernel in the dimension D1, $KV_x$ indicates a dimension value of the original convolution kernel in the dimension D1, and $(N_x, S_x)$ indicates a greatest common divisor of $N_x$ and $S_x$. If $N_x \ne S_x$, the padding quantity $P_2'$ of FD' at the ending boundary in the dimension D1 may be determined, such that the result value of $(P_2'+[P_1/N_x]+FV_x'-KV_x')$ is an integer multiple of $S_x$; otherwise, the padding quantity $P_2'$ of FD' at the ending boundary in the dimension D1 may be determined, such that $P_2'<KV_x'$.

Further, $[P_1/N_x]*N_x-P_1$ zero slices may be padded at the starting boundary of the original convolution kernel in the dimension D1.

In one embodiment, in a case where FD is only folded in the dimension D1 and FD' is obtained as the final folded feature data, the starting boundary and/or the ending boundary of FD' in the dimension D2 may be padded according to a padding manner specified by the convolutional layer to pad FD in another dimension D2 of width and height.

In other embodiments, in a case where FD' is further folded in the dimension D2 to obtain FD" as the final folded feature data according to the splicing number Ny, in step S105, the padding quantity P3, P3≥0 to be padded at the starting boundary of in the feature data FD the dimension D2 may be determined according to a padding manner for the feature data FD specified by the convolutional layer. Then, $[P_3/N_y]$ zero slices may be padded at the starting boundary of FD" in the dimension D1.

Similarly for the ending boundary of FD" in the dimension D2, the padding quantity $P_4$, $P_4 \ge =0$ to be padded at the ending boundary of FD in the dimension D1 may be determined according to a padding manner for the feature data FD specified by the convolutional layer. If $P_4>(FV_y''\times N_y-FV_y')$, $[(P_4-FV_y''\times N_y+FV_y')/N_y]$ zero slices may be padded at the ending boundary of FD" in the dimension D2, where $FV_y'$ and $FV_y''$ indicate the dimension values of FD' and FD" in the dimension D2 (for example, the height value in a case where D2 is the height), respectively. It may also firstly calculate the dimension value $KV_y'=[((N_y/(N_y,S_y))-1)\times S_y+KV_y)/N_y]$ of an expected folded convolution kernel in the dimension D2, where $S_y$ indicates a stride of the original convolution kernel in the dimension D2, $KV_y$ indicates a dimension value of the original convolution kernel in the dimension D2, and $(N_y, S_y)$ indicates a greatest common divisor of $N_y$ and $S_y$. If, $N_y\neq S_y$, the padding quantities $P_4'$ of FD" at the ending boundary in the dimension D2 may be determined, such that the result value of $(P_4'+[P_3/N_y]+FV_y''-KV_y')$ is an integer multiple of Sy; otherwise, the padding quantities $P_4'$ of FD" at the ending boundary in the dimension D2 may be determined, such that $P_4'<KV_y'$.

Further, in this embodiment, $[P3/Ny]*Ny-P3$ zero slices may be further padded at a starting boundary of the original convolution kernel in the dimension D2.

For example, assume that in the example shown in FIG. 2, the convolution kernel K of the weight parameters of the feature data FD has a width 3, a height 3, a depth 3, and a convolution stride 1 in each of width and height, and the padding scheme specified for the feature data FD is to pad the left and right sides each with one column (i.e., one zero slice) and not to pad the upper and lower sides. Then in step S105, as shown in FIG. 4, the feature data FD" in FIG. 3 may be padded with one ($[\frac{1}{2}]=1$) zero slice FP at the left side, and one ($[(1-3\times 2+6)/2]=1$) zero slice FP at the right side to generate a pre-processed folded feature data FD''' with a width 5, and the original convolution kernel K may be padded one ($[\frac{1}{2}]*2-1=1$) zero slice KP at the left side to generate a pre-processed convolution kernel K' with a width 4.

Figure 4:
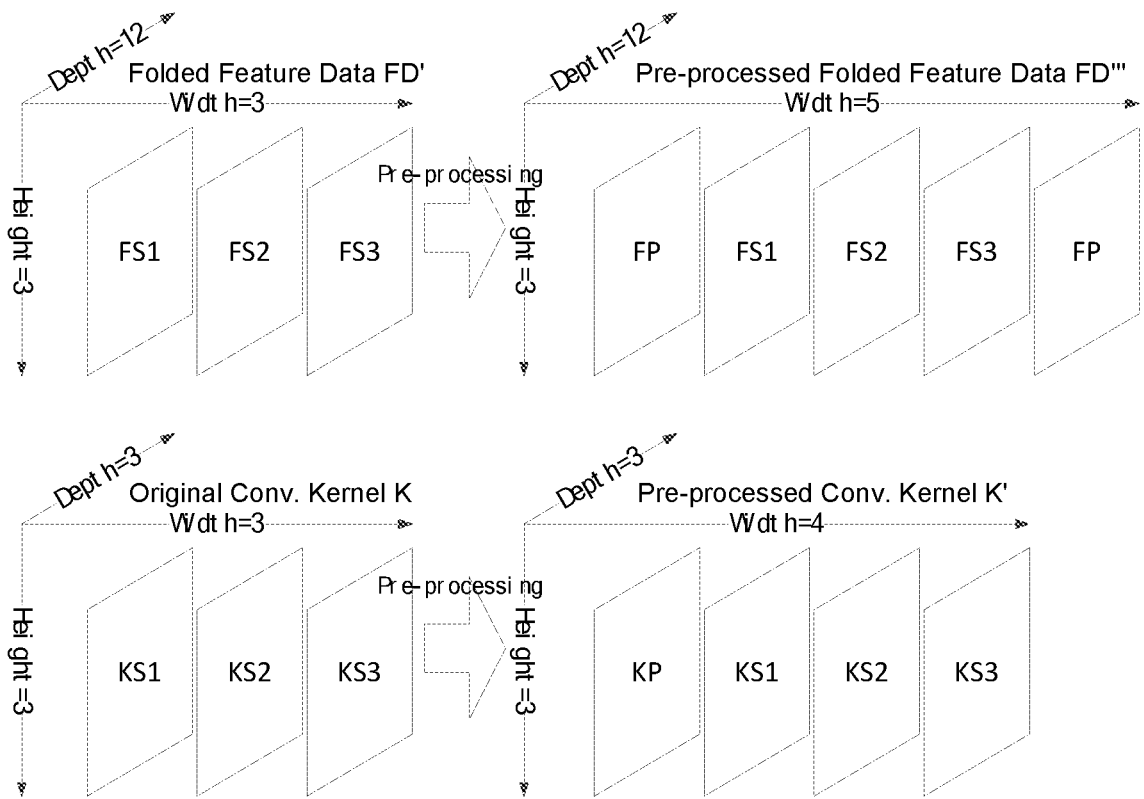
FIG. 4 illustrates an example of pre-processing the folded feature data and an original convolution kernel according to an embodiment of the present disclosure.

Although only one original convolution kernel is shown in the example of FIG. 4, however, it should be appreciated that the weigh parameters of a convolutional layer may also include a plurality of convolution kernels. In such a case, each convolution kernel of the weight parameters may be processed according to the method of an embodiment of the present disclosure.

After the folded feature data and the original convolution kernel are pre-processed, the exemplary method 100 may proceed to step S110 to fold the pre-processed original convolution kernel.

In step S110, the pre-processed convolution kernel K' may be padded with $k_x\times S_x$ zero slices at the starting boundary in the dimension D1 to generate one or more transformed convolution kernels $K'[k_x]$ corresponding to the original convolution kernel K or the pre-processed convolution kernel K', where $S_x$ is a stride of the original convolution kernel K in the dimension D1, and $k_x$ is an integer greater than or equal to 0. For example, three transformed convolution kernels corresponding to the original convolution kernel K may be generated by padding 0 zero slices, Sx zero slices, and 2xSx zero slices, respectively.

At a maximum value of $k_x$ may be set to limit the number of the transformed convolution kernels. For example, $k_x<E_x$ may be set where $E_x$ may be determined as a value obtained by dividing the least common multiple of $S_x$ and $N_x$ by $S_x$, or a value obtained by dividing $N_x$ by the greatest common divisor of $N_x$ and $S_x$, or, in a case where $S_x=1$ or Sx and Nx are relatively prime, a value equal to $N_x$. Thus, $E_x$ trans-formed convolution kernels $K'[k_x]$ corresponding to the original convolution kernel K or the pre-processed convolution kernel K' may be generated.

Then, each transformed convolution kernel $K'[k_x]$ may be folded in the dimension D1 by splicing every $N_x$ consecutive slices in the dimension D1 together in depth to generate a folded convolution kernel $K'[k_x]$ corresponding to the transformed convolution kernel $K'[k_x]$, such that data of all $C_x$ channels in the $(ik_x\times N_x+jk_x)$th slice of the folded convolution kernel $K''[k_x]$ in the dimension D1 correspond to data of consecutive $C_x$ channels starting from the $(jk_x\times C_x)$th channel in the (ikx)th slice of each $K'[k_x]$ in the dimension D1, where $ik_x$ is an integer greater than or equal to 0, and $jk_x$ is an integer greater than or equal to 0 and less than $N_x$.

The generated transformed convolution kernel $K'[k_x]$ may have different dimension values in the dimension D1 (e.g., width values in a case where D1 denotes width), or one or more transformed convolution kernels $K'[k_x]$ have a dimension value in the dimension D1 that is not an integer multiple of $N_x$, so that slices in the corresponding $K''[k_x]$ are not aligned in the depth dimension.

In such a case, the transformed convolution kernels $K'[k_x]$ may be processed similarly to the manner for processing the feature data as described above, such that all transformed convolution kernels $K'[k_x]$ have the same dimension values in the dimension D1 and all slices of the folded convolution kernel $K''[k_x]$ are aligned in the depth dimension. For example, as described above, the property or processing capacity of the hardware (such as an arithmetic unit or a memory supporting multi-channel) may be utilized. For example, in a case where a hardware may have the ability to align channels, a channel without occupied by an actual data may be automatically regarded as having a zero value by a hardware. In such a case, the channels in each slice of $K''[k_x]$ will be automatically aligned by the hardware. For example, if a hardware supports 32 channels simultaneously, the number of channels of $K''[k_x]$ may be automatically aligned as 32 channels by the hardware.

Further, a desired dimension value $EV_x$ of each transformed convolution kernel $K'[k_x]$ in the dimension D1 may also be determined from $E_x$, $S_x$, $N_x$ and the dimension value $V_x$ of the pre-processed convolution kernel K' in the dimension D1. For example, the desired dimension value $EV_x$ of each transformed convolution kernel $K'[k_x]$ in the dimension D1 may be determined by an equation $EV_x=[((E_x-1)\times S_x+V_x)/N_x]\times N_x$. If the dimension value of the transformed convolution kernel $K'[k_x]$ in the dimension D1 is smaller than $EV_x$, then the transformed convolution kernel $K'[k_x]$ may be adjusted by appending a zero slice(s) at the ending boundary of the transformed convolution kernel $K'[k_x]$ in the dimension D1, such that the dimension value of the adjusted transformed convolution kernel $K'[k_x]$ in the dimension D1 is equal to $EV_x$, and the adjusted transformed convolution kernel $K'[k_x]$ may be folded in the dimension D1 to generate the corresponding folded convolution kernel $K''[k_x]$.

In an embodiment, if the feature data FD is only folded in the dimension D1 to obtain FD' as the final folded feature data, then in step S110, the obtained folded convolution kernel K"[kx] may be used as the final folded convolution kernel.

In another embodiment, if the folded feature data FD' is further folded in the dimension D2 to obtain FD" according to the splicing number $N_y$, then in step S110, each folded convolution kernel $k''[k_x]$ may be further folded in the dimension D2 according to the splicing number $N_y$. The process of folding $K''[k_x]$ in the dimension D2 according to $N_y$ is similar to the process of folding the pre-processed convolution kernel K' in the dimension D1 according to $N_x$.

For example, the folded convolution kernel K"[$k_x$] may be padded with $k_y \times S_y$ zero slices at a starting boundary in the dimension D2 to generate one or more transformed convolution kernels K"[kx, ky] corresponding to the folded convolution kernel K"[$k_x$], where $S_y$ is a stride of the original convolution kernel K in the dimension D2, and $k_y$ is an integer greater than or equal to 0. Also, a maximum value of $k_y$ may be set to limit the number of transformed convolution kernels K"[kx, ky]. For example, $k_y < E_y$ may be set, where $E_y$ may be determined as a value obtained by dividing the least common multiple of $S_y$ and $N_y$ by $S_y$, or a value obtained by dividing $N_y$ by the greatest common divisor of $N_y$ and $S_y$, or, a value equal to $N_y$ in a case where $S_y=1$ or $S_y$ and $N_y$ are relatively prime. Thus, $E_x$ transformed convolution kernels K"[kx, ky] corresponding to K"[$k_x$] may be generated, or $E_x \times E_y$ transformed convolution kernels K"[$k_x$, $k_y$] corresponding to K or K' may be generated.

Then, each transformed convolution kernel K"[kx, ky] may be folded in the dimension D2 by splicing every $N_y$ consecutive slices in the dimension D2 together in the depth dimension to generate a folded convolution kernel K'"[kx, ky] corresponding to the transformed convolution kernel K"[kx, ky], such that data of all $C_y$ channels in the ($i_{ky} \times N_y + j_{ky}$)th slice of the folded convolutional kernel K'"[kx, ky] in the dimension D2 correspond to data of consecutive $C_y$ channels starting from the ($j_{ky} \times C_y$)th channel in the ($i_{ky}$) slice of the folded convolutional kernel K"[kx, ky] in the dimension D2, where $i_{ky}$ is an integer greater than or equal to 0, and $j_{ky}$ is an integer greater than or equal to 0 and less than $N_y$.

A desirable dimension value $EV_y$ of each transformed convolution kernel K"[kx, ky] in the dimension D2 may be determined from the dimension values $E_y$, $S_y$, $N_y$, and the dimension value $V_y$ of the pre-processed convolution kernel K' in the dimension D2. For example, the desirable dimension value $EV_y$ of each transformed convolution kernel K"[kx, ky] in the dimension D2 may be determined by an equation $EV_y = [((E_y-1) \times S_y + V_y)/N_y] \times N_y$. If the dimension value of the transformed convolution kernel K"[$k_x$, $k_y$] in the dimension D2 is smaller than $EV_y$, the transformed convolution kernel K"[$k_x$, $k_y$] may be adjusted by appending a zero slice(s) at the ending boundary in the dimension D2, such that the dimension value of the adjusted transformed convolution kernel K"[$k_x$, $k_y$] in the dimension D2 becomes $EV_y$. Then, the adjusted transformed convolution kernel K"[$k_x$, $k_y$] may be folded in the dimension D2 to generate a folded convolution kernel K'"[kx, ky] corresponding to the adjusted transformed convolution kernel K"[$k_x$, $k_y$].

The obtained $E_x \times E_y$ folded convolution kernels K'"[kx, ky] may be used as the final folded convolution kernels.

Figure 5:
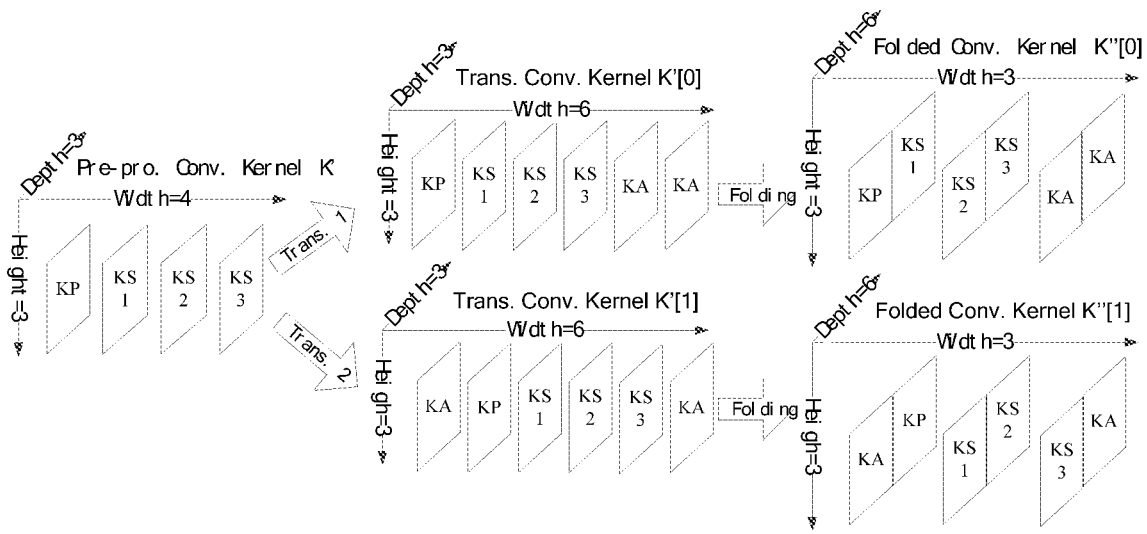
FIG. 5 illustrates an example of folding a pre-processed original convolution kernel in one dimension according to an embodiment of the present disclosure.

FIG. 5 shows an example in which the convolution kernel k' containing 4 width slices in FIG. 4 is folded in the width dimension similarly to FD" in FIG. 3. As shown in FIG. 5, as $N_x=2$ and $S_x=1$, it may be determined that the number of transformed convolution kernels corresponding to the convolution kernel K' is 2. Then, the convolution kernel K' is padded with 0 zero slice KA at the left side and 2 zero slices KA at the right side to obtain an adjusted transformed convolution kernel K'[0] (transformation 1), and is padded with the convolution kernel k' may be padded with 1 zero slice KA at the left side and 1 zero slice KA at the right side to obtain an adjusted transformed convolution kernel K'[1] (transformation 2). The adjusted transformed convolution kernels k'[0] and k'[1] have a width 6 ($[((2-1) \times 1+4)/2] \times 2 = 6$). Then, the adjusted transformed convolution kernel K'[0] may be folded by splicing the slices KS1, KS3, and KA to the ending of the slices KP, KS2, and KA, respectively, to generate a folded convolution kernel K"[0], and the adjust transformed convolution kernel K'[1] may be folded by splicing the slices KP, KS2 and KA to the ending of the slices KA, KS1 and KS3, respectively, to generate a folded convolution kernel K"[1]. The folded convolution kernels k"[0] and k"[1] each have a width 3, a height 3, and a depth 6.

Figure 6:
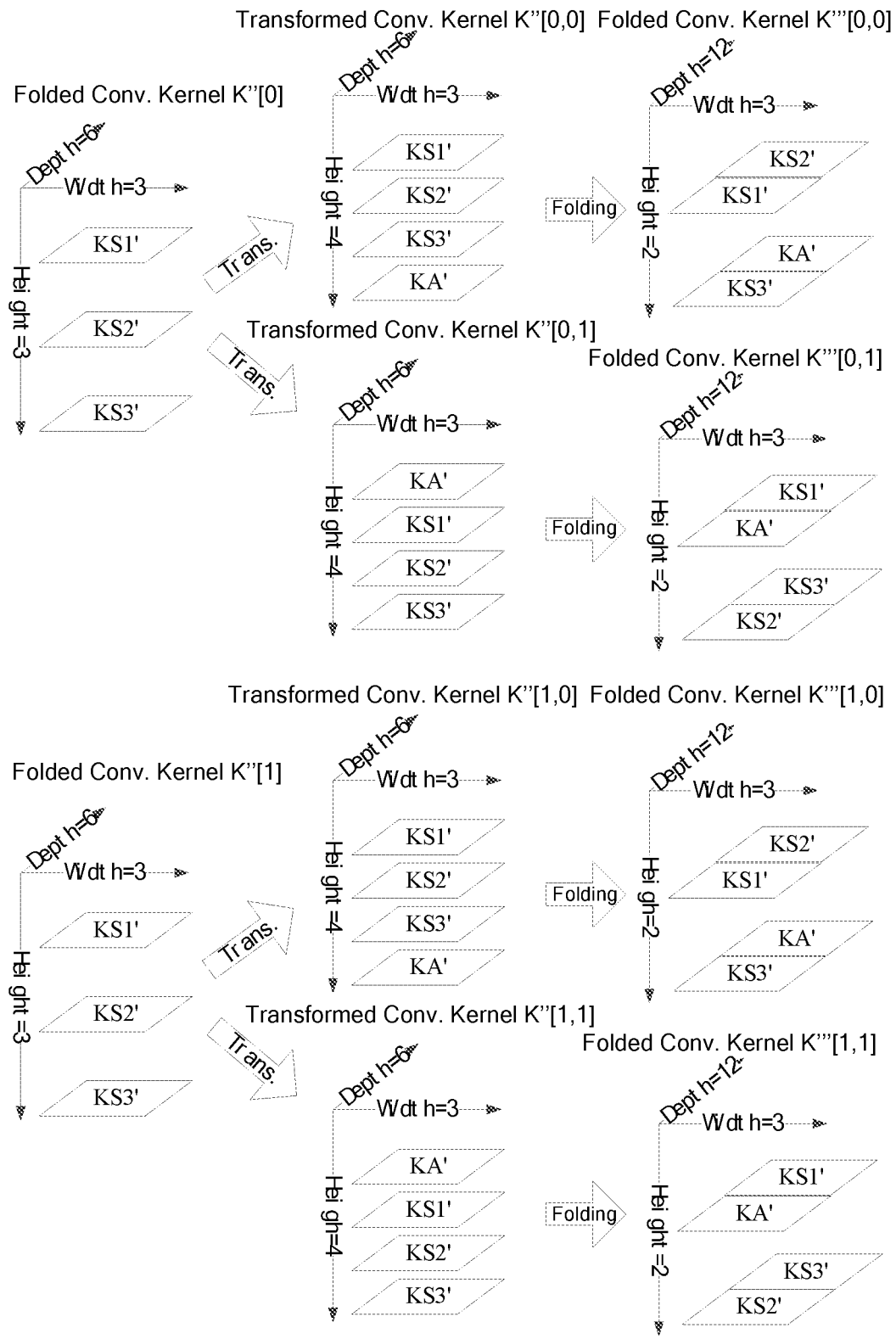
FIG. 6 illustrates an example of folding a pre-processed original convolution kernel in two dimensions according to an embodiment of the present disclosure.

Then, the folded convolution kernels K"[0] and K"[1] each may be further folded in the height dimension. As shown in FIG. 6, as Ny=2 and Sy=1, it may be determined that the number of transformed convolution kernels corresponding to the folded convolution kernel K"[0] is 2. The folded convolution kernel K"[0] may be padded with 0 zero slice KA' at the upper side and 1 zero slice KA' at the lower side to obtain an adjusted transformed convolution kernel K"[0,0], and the folded convolution kernel K"[0] may be padded with 1 zero slice KA' at the upper side to obtain an adjusted transformed convolution kernel K'[0,1]. The folded convolution kernel K"[1] may be padded in a similar way to obtain adjusted transformed convolution kernels K"[1,1] and K"[1,1]. The adjusted transformed convolution kernels K"[0,0], K"[0,1], K"[1,0], and K"[1,1] each have a height 4 ($[((2-1) \times 1+3)/2] \times 2 = 4$). The transformed convolution kernel K"[0,0] may be folded by splicing the slices KS2' and KA' to the ending of the slices KS1' and KS3', respectively, to generate a corresponding folded convolution kernel K'"[0, 0]. The trans formed convolution kernels K"[0,1], K"[1,0], and K"[1,1] may be folded in a similar way to generate corresponding folded convolution kernels K'"[0,1], K'"[1,0] and K'"[1,1], respectively. The folded convolution kernels K'"[0,1], K'"[1,0], and K'"[1,1] each have a width 3, a height 2, and a depth 12.

However, in other embodiments, step S105 may be split into two portions, in one of which pre-processing folded feature data, and the other of which pre-processing an original convolution kernel, and step S101 and a pre-processing for the folded feature data may be performed after the pre-processing for the original convolution kernel and step S110, or the step S101 and the pre-processing for the folded feature data may be performed in parallel with the pre-processing for the original convolution kernel and step S110.

The exemplary method 100 may then proceed to step S115, to convolve the pre-processed folded feature data obtained in step S105 by using the one or more folded convolution kernels obtained in step S110.

If the unfolded original feature data FD is folded in only one dimension D1 of width and height according to the splicing number $N_x$ to obtain the folded feature data FD' in step S101, then, in step S115, the convolution operation may be performed on the pre-processed folded feature data obtained in step S105 by using $E_x$ folded convolution kernel K"[$k_x$] obtained in step S110. In such a case, if the original convolution kernel K has a stride $S_x$ in the dimension D1 that is equal to $N_x$, then each folded convolution kernel K"[$k_x$] has a stride 1 in the dimension D1; otherwise, each folded convolution kernel K"[$k_x$] has a stride $S_x$ in the dimension D1. In addition, each folded convolution kernel K"[$k_x$] has a stride in the other dimension D2 of width and height that is equal to the stride $S_y$ of the original convolution kernel K in the dimension D2.

If the feature data FD' is further folded in the dimension D2 of width and height according to the splicing number $N_y$ to obtain the folded feature data FD" in step S101, then in step S115, a convolution operation may be performed on the pre-processed folded feature data obtained in step S105 by using $E_x \times E_y$ to obtain the folded convolution kernel K'''[$k_x$, $k_y$] obtained in step S110. In such a case, if the original convolution kernel K has a stride $S_x$ in the dimension D1 that is equal to $N_x$, each folded convolution kernel K'''[$k_x$, $k_y$] has a stride 1 in the dimension D1; otherwise, each folded convolution kernel K'''[$k_x$, $k_y$] has a stride $S_x$ in the dimension D1. In addition, if the original convolution kernel K has a stride $S_y$ in the dimension D2 that is equal to $N_y$, each folded convolution kernel K'''[$k_x$, $k_y$] has a stride 1 in the dimension D2; otherwise, each folded convolution kernel K'''[$k_x$, $k_y$] has a stride $S_y$ in the dimension D2.

In an embodiment, in step S115, all folded convolution kernels may be used to convolve a same portion of the folded feature data and then moved the stride in the dimension D1 or D2 to convolve a next, portion of the folded feature data, until all portions of the folded feature data have been convolved, a final output feature data is generated.

Figure 7:
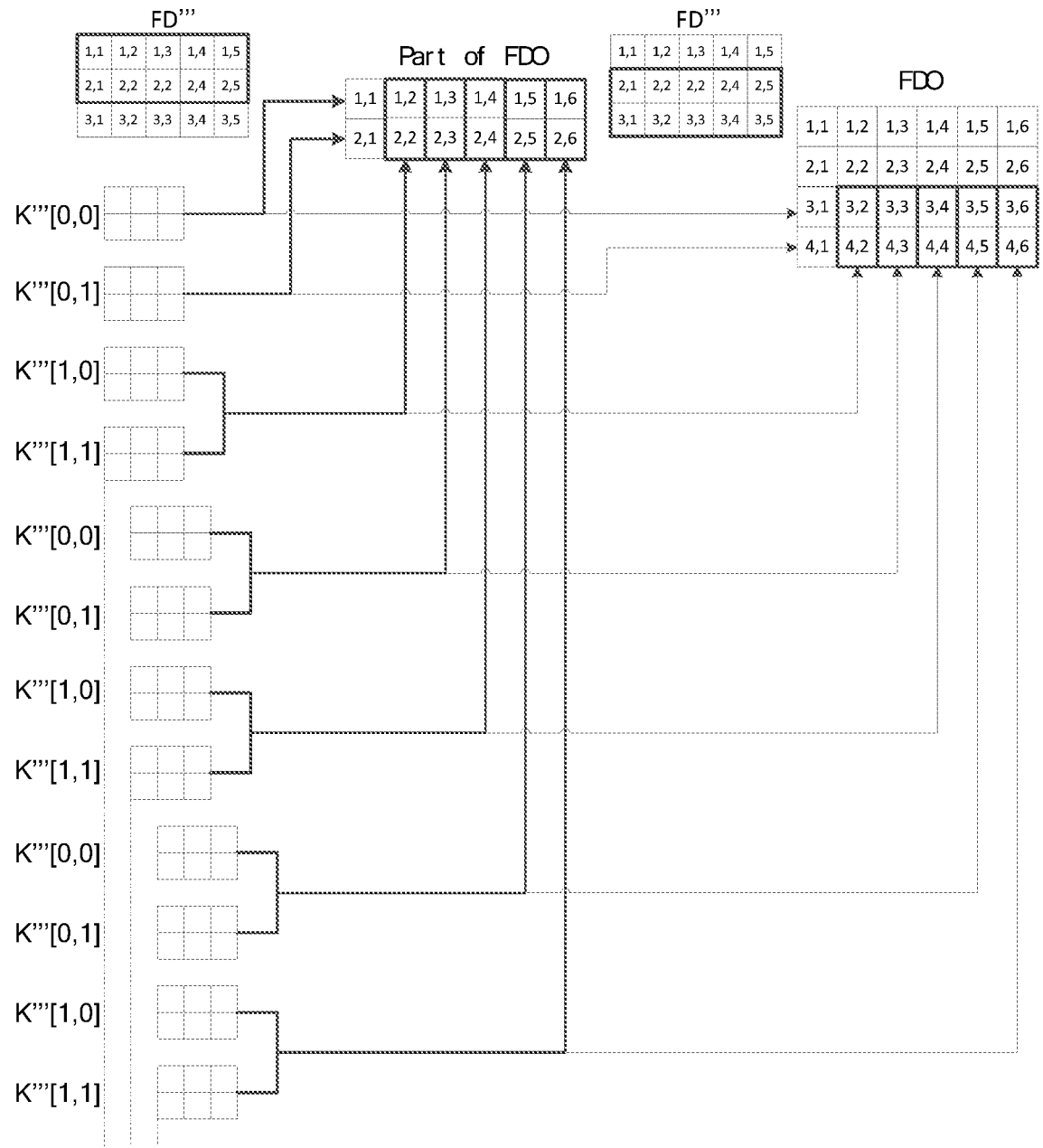
FIG. 7 illustrates an example of convolving according to an embodiment of the present disclosure.

FIG. 7 illustrates an example of how the convolution operation can be performed. In the example of FIG. 7, the folded convolution kernels K'''[0,0], K'''[0,1], K'''[1,0], and K'''[1,1] in FIG. 6 are used to convolve the folded feature data FD''' in FIG. 4.

As shown in FIG. 7, firstly, the four folded convolution kernels k''[0,0], k''[0,1], k''[1,0] and k''[1,1] are used to convolve a portion of the folded feature data FD''' containing data (1,1), (1,2), (1,3), (2,1), (2,2) and (2,3) in the first and second rows to obtain a portion of the output feature data FDO including data (1,1), (2,1), (1,2) and (2,2), respectively. Then, the four folded convolution kernels K'''[0,0], K'''[0,1], K'''[1,0], and K'''[1,1] move a stride 1 (i.e. the stride of the original convolution kernel K in width) in width to convolve a portion of the folded feature data FD''' containing data (1,2), (1,3), (1,4), (2,2), (2,3), and (2,4) in the first and second rows, resulting in a portion of the output feature data FDO including data (1,3), (2,3), (1,4), and (2,4), respectively. Then, the four folded convolution kernels K'''[0,0], K'''[0,1], K'''[1,0], and K'''[1,1] further move a stride 1 (i.e. the stride of the original convolution kernel K in width) in width to convolve a portion of the folded feature data FD''' containing data (1,3), (1,4), (1,5), (2,3), (2,4), and (2,5) in the first and second rows, obtaining a portion of the output feature data FDO including data (1,5), (2,5), (1,6), and (2,5).

After convolving the first and second rows of the folded feature data FD''', the four folded convolution kernels K'''[0,0], K'''[0,1], K'''[1,0], and K'''[1,1] move a stride 1 (i.e. the stride of the original convolution kernel K in height) in height to convolve the second and third rows of the folded feature data FD'''. The convolution operation on the second and third rows of the folded feature data FD''' is similar to the convolution operation on the first and second rows of the folded feature data FD''' using the four folded convolution kernels K'''[0,0], K'''[0,1], K'''[1,0] and K'''[1,1], and a repetitive description thereof will be omitted here.

A final output feature data FDO is obtained after convolving the folded feature data FD''' with the four folded convolution kernel K'''[0,0], K'''[0,1], K'''[1,0] and K'''[1,1]. The last row including data (4,1), (4,2), (4,3), (4,4), (4,5) and (4,6) of the output feature data FDO may be retained or discarded as needed. For example, if the unfolded original feature data FD as shown in FIG. 2 is desired to be convolved with the original convolution kernel K shown in FIG. 4 to obtain a three-row output feature data (accordingly, the unfolded original feature data FD is not padded in height), the last row including data (4,1), (4,2), (4,3), (4,4), (4,5) and (4,6) of the output feature data FDO may be discarded.

In a case where the weight parameters of the convolutional layer include a plurality of convolution kernels, the output feature data FDO in the example of FIG. 7 may correspond to data in a channel of the final output feature data.

In other embodiments, each folded convolution kernel may be used to convolve the entire folded feature data. In such a case, it does not need to modify convolution instructions for the hardware. However, if one original convolution kernel corresponds to a plurality of folded convolution kernels, a partial result obtained by using each folded convolution kernel will be in multiple channels. The partial result in multiple channels may be re-organized or unfolded to obtain a complete output in one channel before the output feature data is provided to a next layer of the convolutional neural network or regarded as the final output of the entire convolutional neural network.

Figure 8:
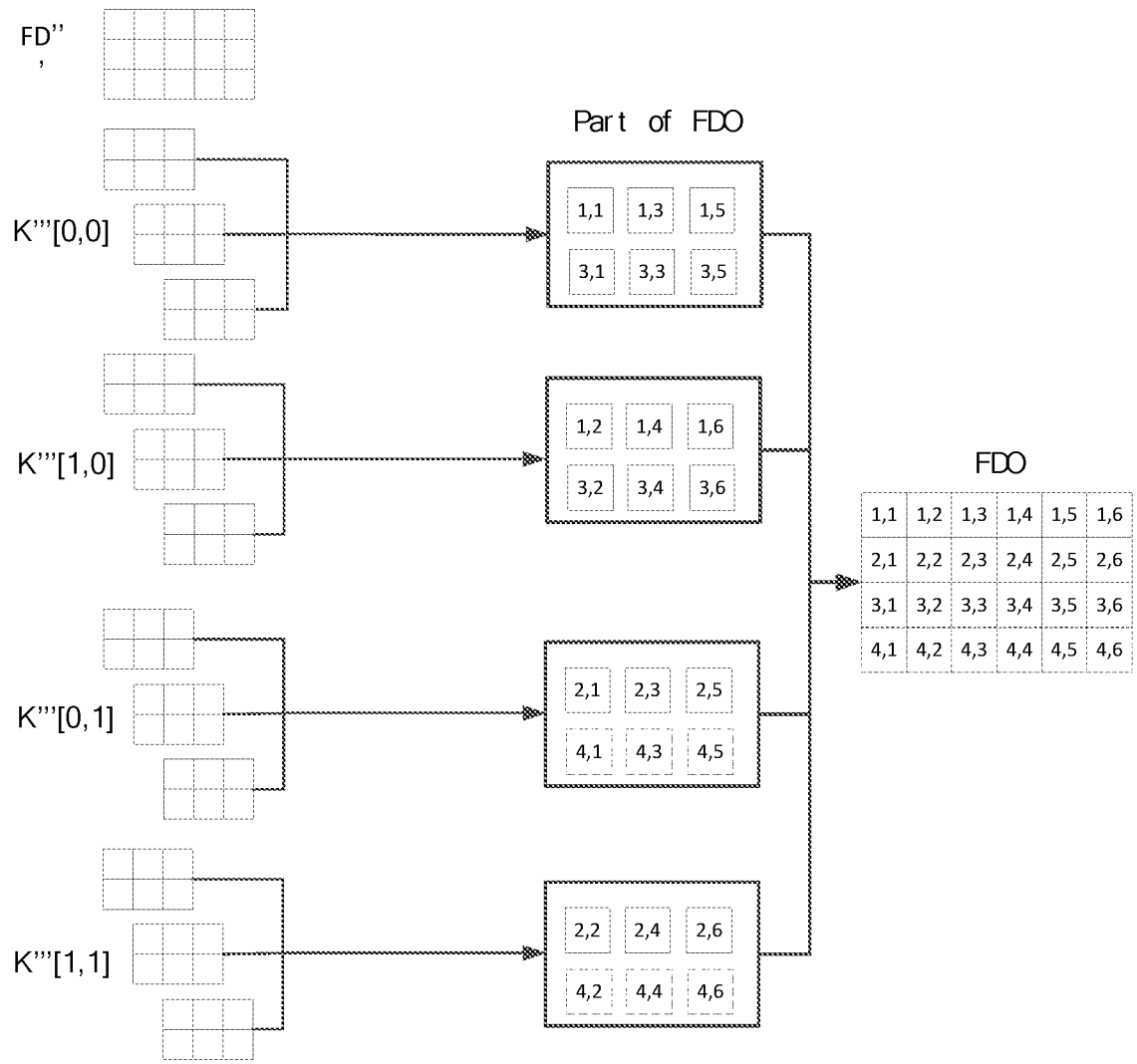
FIG. 8 illustrates an example of convolving according to an embodiment of the present disclosure.

FIG. 8 illustrates an example of how the convolution operation can be performed. Unlike the example of FIG. 7, in the example of FIG. 8, the four folded convolution kernels K'''[0,0], K'''[0,1], K'''[1,0] and k'''[1,1] each are used to convolve the entire folded feature data FD'''. As shown in FIG. 8, only a portion of the output feature data FDO can be obtained using each of the folded convolution kernels. For example, the folded convolution kernel K'''[0,0] may convolve the folded feature data FD''' to generate only a portion of the output feature data FDO including data (1,1), (1,3), (1,5), (3,1), (3,3) and (3,5). The portions of data obtained by using the respective folding convolution kernels may be organized together to obtain the complete output feature data FDO. Similarly, in a case where the weight parameters of the convolutional layer include a plurality of convolution kernels, the output feature data FDO in the example of FIG. 8 may correspond to data in a channel of the final output feature data.

The folding operating for the feature data and the convolution kernel and the convolution operation on the obtained folded feature data and the folded convolution kernel, improve channel utilization and operation efficiency, and reduce cache consumption.

For example, assume that a processor (for example, an array of multipliers for convolution operation) is capable of processing 32 channels simultaneously and a RGB image (the number of channels is 3) of 720×1280 is convolved (the strides in width and height both are 1) by using a convolution kernel of 5×5, the comparison among the operation quantities of conventional convolution (i.e. the convolution is performed by using the original convolution kernel to perform convolution on the unfolded original feature data), width folded convolution (i.e. folding the feature data and the original convolution kernel every 2 slices in width, and then performing convolution), and width-height folded convolution (i.e. folding the feature data and the original convolution kernel every 2 slices in width and height, respectively, and then performing convolution) is shown in the following Table 1:

TABLE 1

| | Number of multiplications | Operation Formula | Comparison between operation quantity of convention convolution | Effective operation rate |
|---|---|---|---|---|
| Convention convolution | 737280000 | 32 × 720 × 1280 × 5 × 5/1 | 1 | 0.09375 |
| Width folded convolution | 442368000 | 32 × 360 × 1280 × 3 × 5/(1/2) | 0.6 | 0.1875 |
| Width-height folded convolution | 265420800 | 32 × 360 × 640 × 3 × 3/(1/4) | 0.36 | 0.375 |

The example data in Table 1 shows that the operation quantity can be apparently reduced (for example, an operation quantity using the width-height folded convolution is only 36% of the operation quantity using the conventional convolution), and the effective operation rate may be apparently improved (for example, the effective operation rate using the width-height folded convolution is about 4 times higher than that using the conventional convolution) by folding the feature data and the convolution kernel and performing convolution operation using the obtained folded feature data and the folded convolution kernel.

Figure 9:
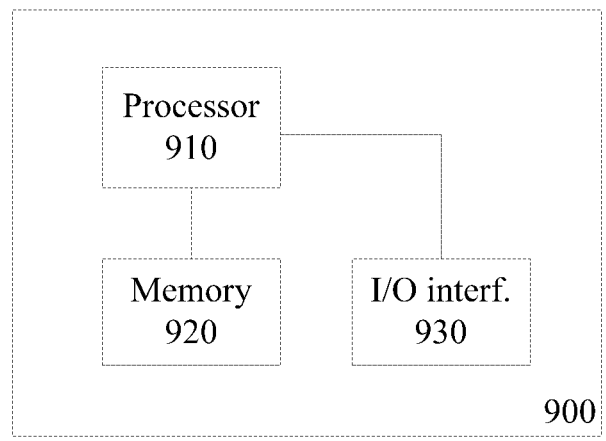
FIG. 9 illustrates an example of an apparatus for performing an operation of a convolutional layer in a convolutional neural network according to an embodiment of the present disclosure.
Figure 10:
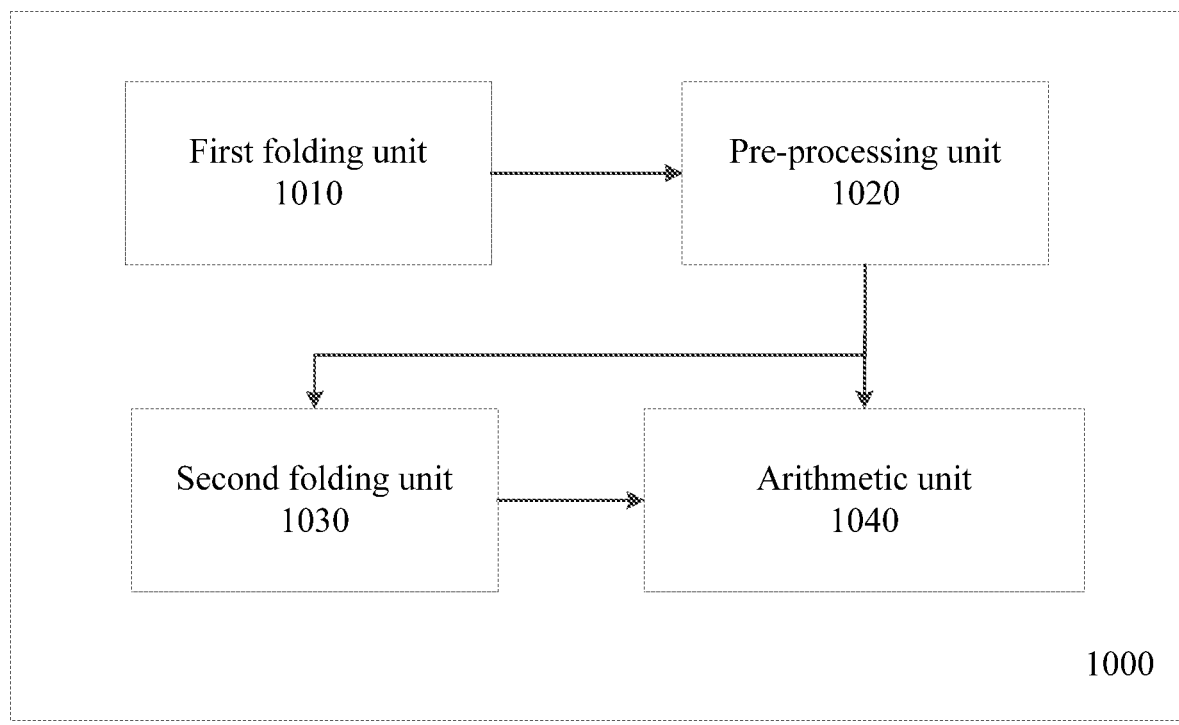
FIG. 10 illustrates an example of an apparatus for performing an operation of a convolutional layer in a convolutional neural network according to an embodiment of the present disclosure.

FIG. 9 and FIG. 10 illustrate a block diagram of an exemplary apparatus for performing a convolution operation of a convolutional laser in a convolutional neural network according to an embodiment of the present disclosure, respectively.

As shown in FIG. 9, the exemplary apparatus 900 may include a processor 910. The processor 910 may be a processor in any form that is able to process data and/or execute instructions, such as a general-purpose CPU, a GPU, or a neural network-dedicated processor or accelerator. For example, the processor 910 may carry out the method of folding a feature data and a convolution kernel and performing a convolution operation using folded feature data and a folded convolution kernel according to an embodiment of the present disclosure. In addition, the processor 910 may control other components in the apparatus 900 to perform desired functions.

The processor 910 may be connected to a memory 920 and an I/O interface 930 through a bus system and/or an interconnection mechanism in other forms (not shown).

The memory 920 may include a computer readable and writable storage medium in various forms, for example, a volatile memory and/or a non-volatile memory. Examples of the volatile memory may include but not be limited to a random access memory (RAM) and/or a cache, etc. Examples of the non-volatile memory may include but not be limited to a read only memory (ROM), a hard disk, a flash memory etc. Examples of the readable and writable storage medium may include but not be limited to an electric, a magnetic, an optical, an electromagnetic, an infrared, or a semiconductor system, apparatus, or device or any combination of the above. For example, when being used in combination with a neural network dedicated processor, the memory 920 may be a RAM on a chip carrying a dedicated processor. The memory 920 may include program instructions for instructing the device 900 to execute the method of folding a feature data and a convolution kernel and performing a convolution operation using folded feature data and a folded convolution kernel according to an embodiment of the present disclosure.

The I/O interface 930 may serve to provide parameters or data to the processor 910 and output the result data processed by the processor 910.

As shown in FIG. 10, an exemplary apparatus 1000 may include a first folding unit 1010, a pre-processing unit 1020, a second folding unit 1030, and an arithmetic unit 1040.

The first folding unit 1010 may be configured to fold unfolded feature data provided to a convolutional layer in at least one dimension of width and height to generate folded feature data.

In one embodiment, the first folding unit 1010 may be configured to perform, for example, step S101 in the exemplary method 100 as shown in FIG. 1.

The pre-processing unit 1020 may be configured to pre-process the folded feature data and an original convolution kernel of the convolutional layer. In one embodiment, the pre-processing unit 1020 may be configured to perform, for example, step S105 in the exemplary method 100 as shown in FIG. 5.

The second folding unit 1030 may be configured to fold the pre-processed original convolution kernel in at least one dimension to generate one or more folded convolution kernels corresponding to the original convolution kernel. In one embodiment, the second folding unit 1030 may be configured to perform, for example, step S110 of the exemplary method 100 as shown in FIG. 1.

The arithmetic unit 1040 may be configured to perform a convolution operation on the pre-processed folded feature data using the generated one or more folded convolution kernels. In one embodiment, the arithmetic unit 1040 may be configured to perform, for example, step S115 of the exemplary method 100 shown in FIG. 1.

It should be understood that the apparatus 900 and apparatus 1000 are shown in FIG. 9 and FIG. 10 as only examples but not to limit the present disclosure in any way. The apparatus according to the embodiments of the present disclosure may include other components and/or structure as needed.

Figure 11:
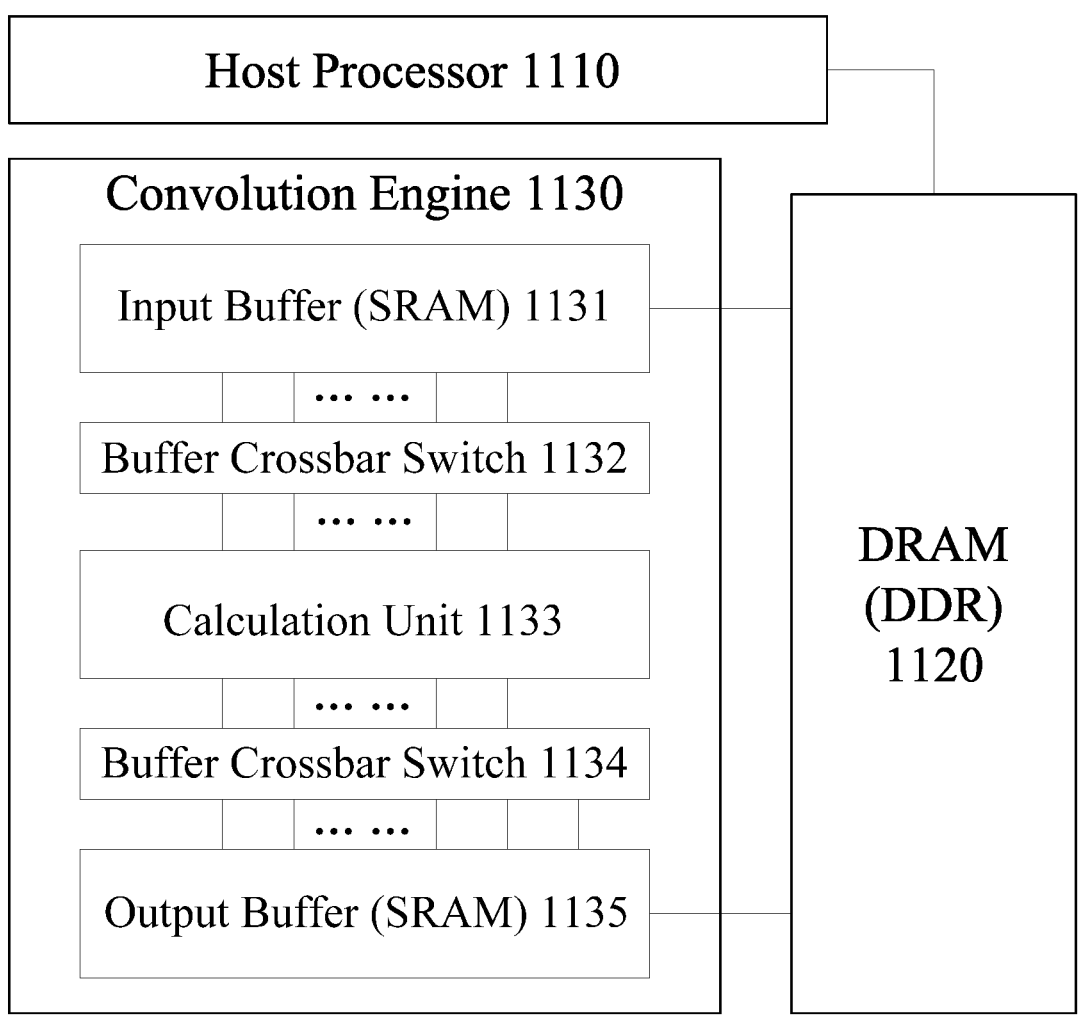
FIG. 11 shows an example of a device for performing a convolution operation on folded feature data according to an embodiment of the present disclosure.

FIG. 11 shows an example of a device for performing a convolution operation on folded feature data according to an embodiment of the present disclosure. Referring to FIG. 11, the device 1100 may include a host processor 1110, a dynamic random access (DRAM) 1120, and a convolution engine 1130. They are interconnected with each other via a bus system 1101.

The host processor 1110 may be an ARM processor, a general-purpose Central Processor (CPU), or any other types of processors or controller, and it can execute program instructions to control operation of other components in the device 1100 such as the DRAM 1120 and the convolution engine 1130 as described below.

The DRAM 1120 may be a DDR RAM or any other types of DRAMs, and it can temporarily store data read from a non-volatile storage such as a magnetic hard disk. For example, the above-mentioned unfolded feature data and original convolution kernel for a convolution layer in a convolution neural network or program instructions to be executed by the host processor 1110 may be temporarily stored in the DRAM 1120.

The convolution engine 1130 may read the unfolded feature data and the original convolution kernel from the DRAM 1120 to perform a convolution operation in accordance with any one of the methods disclosed above. The convolution engine 1130 maybe formed as a chip, and its components and operations will be discussed below in detail.

Referring to FIG. 11, the convolution engine 1130 may include an input buffer 1131, which may be a static random access memory (SRAM). The unfolded feature data and the original convolution kernel may be read from the DRAM 1120 and stored in the SRAM 1131. In the example shown in FIG. 11, the unfolded feature data and the original convolution kernel are stored in the same SRAM 1131. In other examples, they may be stored in separated SRAMs. Before or while being stored in the SRAM 1131, the unfolded feature data and the original convolution kernel may be folded and pre-processed as described above with reference to FIGS. 1.-6. Details of the folding and pre-processing will not be repeated herein.

Figure 12A:
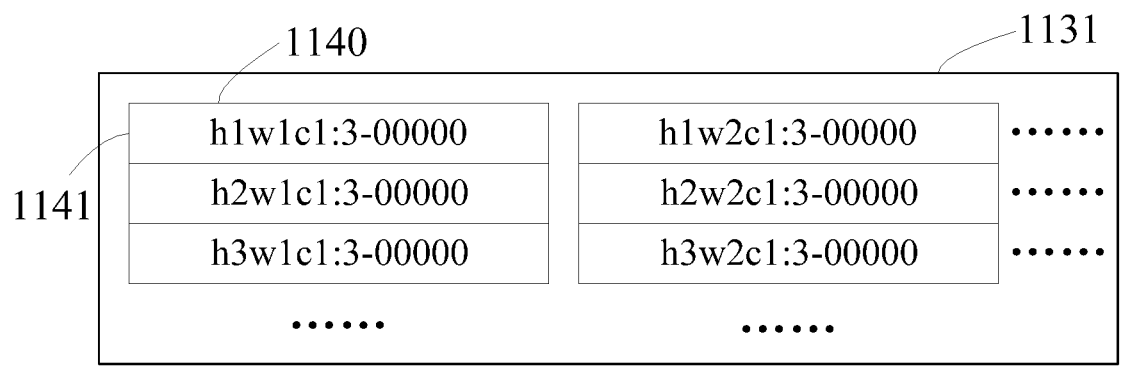
FIGS. 12A and 12B show examples of how the feature data are stored in a static random access memory.
Figure 12B:
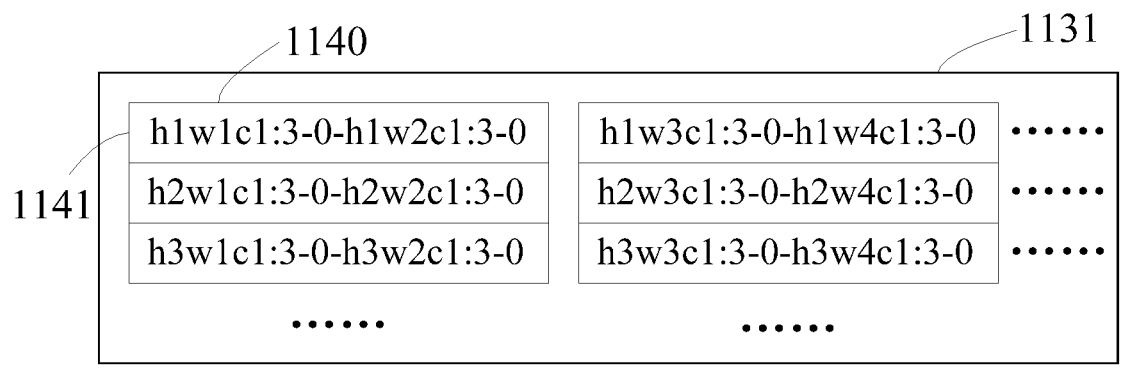

In an embodiment, folding, pre-processing and storing of the unfolded feature data may be performed in one step. For example, while the unfolded feature data read from the DRAM 1120 are being written into the SRAM 1131, additional zero values may be inserted into a data stream of the unfolded feature data and the unfolded feature data may be written in a predetermined format into the SRAM 1131 so that the feature data stored in the SRAM 1131 have been folded and pre-processed. FIGS. 12A and 12B show examples of how the feature data are stored in the SRAM 1331, where FIG. 12A shows the original feature data FD of FIG. 1, and FIG. 12B shows the folded feature data FD' of FIG. 1.

Referring to FIG. 12A first, the SRAM 1131 may include a plurality of memory units 1141 arranged in plural columns 1140, and each column 1140 may also be called as a "slice". Each SRAM slice 1140 is continuously addressed in the column direction and may accommodate a plurality of bits in the width direction. Assuming that each slice 1140 has a width of 64 bits, each memory unit 1141 can store 8 data. As the original feature data FD are not folded, only one pixel (3 data for 3 channels) is stored in each cell 1141, and remaining 40 (64−3*8) bits of the cell 1141 are padded with 5 zero values, as shown in FIG. 12A. For the folded feature data FD', however, two pixels may be stored in each cell 1141, and at the end of each pixel is padded only one zero value, as shown in FIG. 12B. In another example, instead, two zero values may be padded at the end of the second pixel. It would be understood that if the cell 1141 has a larger width, more pixels may be stored in each cell 1141.

In addition, the original convolution kernel may be pre-processed and folded before or while being stored in the SRAM 1131. As described above with reference to FIGS. 4-6, the original convolution kernel may be pre-processed and folded in at least one dimension of width or height according to a folding manner of the folded feature data to generate one or more folded convolution kernels corresponding to the original convolution kernel. Details of the folding will not be repeated herein. The one or more folded convolution kernels may be stored in the SRAM 1131. Also, the pre-processing, folding and storing of the original convolution kernel may be performed in one step. For example, data of the original convolution kernel read from the DRAM 1120 may be written in a predefined format into the SRAM 1131, and additional zero values may be inserted into a data stream of the original convolution kernel so that the convolution kernel stored in the SRAM 1131 is pre-processed and folded as described above. Storage of the one or more folded convolution kernels may be similar to that of the folded feature data as described above with reference to FIGS. 12A and 12B, except that they are stored in different slices 1140. Details of storage of the kernels in the SRAM 1131 will be omitted herein. It should be understood that as the SRAM 1131 has a capability smaller than the DRAM 1120, it may read only a portion of the feature data and a portion of the kernels at one time.

Referring back to FIG. 11, the folded feature data and the one or more folded convolution kernels may be read from the SRAM 1131 into a calculation unit 1133 to perform a convolution operation on the folded feature data with the one or more folded convolution kernels. The calculation unit 1133 may include a plurality of multipliers and a plurality of adders for the convolution operation. In an embodiment, the calculation unit 1133 may simultaneously calculate products of plural pixels in the folded feature data each with a corresponding pixel of plural folded convolution kernels. By doing so repeatedly, a same portion of the folded feature data may be convolved by all the folded convolution kernels. For example, if the calculation unit 1133 includes 256 multipliers, it may simultaneously multiply 8 pixels (each having 4 channels, 32 data in total) of the folded feature data each with a corresponding pixel (also having 4 channels) in 8 kernels, generating 64 (8 pixels*8 channels) data. As compared with a conventional case where the feature data is not folded, calculation efficiency is greatly improved.

The calculation results from the calculation unit 1133 may be stored in an output buffer (SRAM) 1135. The input buffer 1131 and the output buffer 1135 each are equipped with a buffer crossbar switch 1132, 1134 to control data provided to or received from the calculation unit 1133. If necessary, the calculation results may also be moved from the output buffer 1135 to the DRAM 1120.

Unless the context clearly requires otherwise, throughout the description and the claims, the words "comprise", "comprising" and the like are to be construed in an inclusive sense, as opposed to an exclusive or exhaustive sense; that is to say, in the sense of "including but not limited to". The word "coupled", as generally used herein, refers to two or more elements that may be either directly connected, or connected by way of one or more intermediate elements. Additionally, the words "herein", "above", "below", and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing an operation of a convolutional layer in a convolutional neural network, comprising:
reading unfolded feature data provided to the convolution layer and an original convolution kernel of the convolutional layer from a dynamic random access memory (DRAM);
folding the unfolded feature data in at least one dimension of width and height to generate folded feature data;
pre-processing the folded feature data and the original convolution kernel;
storing pre-processed folded feature data into a static random-access memory (SRAM);
folding a pre-processed original convolution kernel in the at least one dimension to generate one or more folded convolution kernels corresponding to the original convolution kernel;
storing the one or more folded convolution kernels in the SRAM; and
reading the pre-processed folded feature data and the one or more folded convolution kernels from the SRAM into a calculation unit for convolving the pre-processed folded feature data with the one or more folded convolution kernels,
wherein the folding the unfolded feature data in at least one dimension comprises:
performing a first folding on the unfolded feature data in a first dimension by splicing every $N_x$ consecutive slices in the first dimension in depth together, wherein the first dimension is one of width and height, and $N_x$ is an integer greater than 1, and
wherein data of all $C_x$ channels in the $(i_{fx} \times N_x + i_{fx})$th slice of the unfolded feature data in the first dimension correspond to data of all consecutive $C_x$ channels starting from the $(i_{fx} \times C_x)$th channel in the $(i_{fx})$th slice of the result of the first folding in the first dimension, where $i_{fx}$ is an integer greater than or equal to 0, $i_{fx}$ is an integer greater than or equal to 0 and less than $N_x$, and $C_x$ is an integer greater than 0.

2. The method of claim 1, wherein the SRAM includes a plurality of memory units, at least every two pixels of the pre-processed folded feature data are stored in a same memory unit, and at least every two pixels of each folded convolution kernel are stored in a same memory unit.

3. The method of claim 1, wherein the calculation unit comprises a plurality of multipliers and a plurality of adders.

4. The method of claim 1, wherein the pre-processing comprises:
determining a first padding quantity $P_1$ at a starting boundary of the first feature data in the first dimension according to a padding manner specified by the convolutional layer, the first padding quantity $P_1$ being greater than or equal to 0;
padding $\lceil P_1/N_x \rceil$ zero slices at the starting boundary of the result of the first folding in the first dimension, where "$\lceil \; \rceil$" indicates an upward rounding operation; and
padding $\lceil P_1/N_x \rceil * N_x - P_1$ zero slices at the starting boundary of the original convolution kernel in the first dimension.

5. The method of claim 1, wherein when the original convolution kernel has a first stride in the first dimension that is not equal to $N_x$, the convolving comprises:
moving all the folded convolution kernels corresponding to the original convolution kernel simultaneously by the first stride in the first dimension after convolving a same portion of the pre-processed folded feature data with all the folded convolution kernels corresponding to the original convolution kernel, or
convolving the entire pre-processed folded feature data with each of the folded convolution kernels corresponding to the original convolution kernel, respectively, where each of the folded convolution kernels has a stride in the first dimension that is equal to the first stride.

6. The method of claim 5 wherein convolving a same portion of the pre-processed folded feature data with all the folded convolution kernels comprises:
simultaneously calculating, by the plurality of multipliers, products of plural pixels in the pre-processed folded feature data each with a corresponding pixel of plural folded convolution kernels.

7. The method of claim 1, wherein when the original convolution kernel has a stride in the first dimension that is equal to $N_x$, each of the folded convolution kernels has a stride 1 in the first dimension.

8. The method of claim 1, wherein the folding the pre-processed original convolution kernel in the at least one dimension comprises:
padding $k_x \times S_x$ zero slices padded at a starting boundary of the pre-processed original convolution kernel in the first dimension to generate $E_x$ first transformed convolution kernels, respectively, where $S_x$ is a first stride of the original convolution kernel in the first dimension, $E_x$ is greater than or equal to 1 and depends on $N_x$ and $S_x$, and $k_x$ is an integer greater than or equal to 0 and less than $E_x$; and
performing a second folding on each first transformed convolution kernel in the first dimension by splicing each $N_x$ consecutive slices in the first dimension in depth together to generate a corresponding first folded convolution kernel.

9. The method of claim 8, wherein data of all $C_x$ channels in the $(i_{kx} \times N_x + j_{kx})$th slice of each first transformed convolution kernel in the first dimension correspond to data of all consecutive $C_x$ channels starting from the $(j_{kx} \times C_x)$th channel in the $(ik_x)$ slice of the corresponding first folded convolution kernel in the first dimension, where $i_{kx}$ is an integer greater than or equal to 0, and $j_{kx}$ is an integer greater than or equal to 0 and less than $N_x$.

10. The method of claim 8 wherein the folding unfolded feature data in at least one dimension further comprises:
performing a third folding on the result of the first folding in the second dimension by splicing every $N_y$ consecutive slices in the second dimension in depth together, where the second dimension is one of width and height, $N_y$ is an integer greater than 1.

11. The method according to claim 10, wherein data of all $C_y$ channels in the $(i_{fy} \times N_y + j_{fy})$th slice of the result of the first folding in the second dimension correspond to data of consecutive $C_y$ channels starting from the $(j_{fy} \times C_y)$th channel in the $(i_{fy})$ slice of the result of the third folding in the second dimension, where $i_{fy}$ is an integer greater than or equal to 0, $j_{fy}$ is an integer greater than or equal to 0 and less than $N_y$, and $C_y$ is an integer greater than 0.

12. The method of claim 10 wherein the pre-processing comprises:
determining a third padding quantities $P_3$ at a starting boundary of the unfolded feature data in the second dimension according to a padding manner specified by the convolutional layer, the third padding quantiy $P_3$ being greater than or equal to 0;
padding $\lceil P_3/Ny \rceil$ zero slices at the starting boundary of the result of the third folding in the second dimension, where "$\lceil \ \rceil$" indicates an upward rounding operation; and
padding $\lceil P_3/N_y \rceil * N_y - P_3$ zero slices at the starting boundary of the original convolution kernel in the second dimension.

13. The method of claim 10 wherein the folding the pre-processed original convolution kernel in the at least one dimension further comprises:
padding $k_y \times S_y$ zero slices at the starting boundary of the first folded convolution kernel in the second dimension to generate $E_y$ second transformed convolution kernels for each first folded convolution kernel, where $S_y$ is a second stride of the original convolution kernel in the second dimension, $E_y$ is greater than or equal to 1 and depends on $N_y$ and $S_y$, and $k_y$ is an integer greater than or equal to 0 and less than $E_y$; and
performing a fourth folding on each second transformed convolution kernel in the second dimension by splicing every $N_y$ consecutive slices in the second dimension in depth together, to generate a second folded convolution kernel corresponding to the second transformed convolution kernel.

14. The method of claim 13, wherein data of all $C_y$ channels in the $(i_{ky} \times N_y + j_{ky})$th slice of each second transformed convolution kernel in the second dimension correspond to data of consecutive $C_y$ channels starting from the $(j_{ky} \times C_y)$th channel in the $(i_{ky})$th slice of each second transformed convolution kernel in the second dimension, where $i_{ky}$ is an integer greater than or equal to 0, and $j_{ky}$ is an integer greater than or equal to 0 and less than $N_y$.

15. The method of claim 10 wherein when the original convolution kernel has a second stride in the second dimension that is not equal to $N_y$, the convolving further comprises:
moving all the folded convolution kernels corresponding to the original convolution kernel simultaneously by the second stride in the second dimension after convolving a same portion of the pre-processed folded feature data with all the folded convolution kernels corresponding to the original convolution kernel, or
convolving the entire pre-processed folded feature data with each of the folded convolution kernels corresponding to the original convolution kernel, respectively, where each of the folded convolution kernels has a stride in the second dimension that is equal to the second stride.

16. The method of claim 10 wherein when the original convolution kernel has a second stride in the second dimension that is equal to $N_y$, each of the folded convolution kernel has a stride 1 in the second dimension.

17. An apparatus for performing an operation of a convolutional layer in a convolutional neural network, comprising:
one or more processors configured to execute instructions stored in a memory, execution of the instructions causing the one or more processors to perform the following steps:
reading unfolded feature data provided to the convolution layer and an original convolution kernel of the convolutional layer from a dynamic random access memory (DRAM);
folding the unfolded feature data in at least one dimension of width and height to generate folded feature data;
pre-processing the folded feature data and the original convolution kernel;
storing pre-processed folded feature data into a static random-access memory (SRAM);
folding a pre-processed original convolution kernel in the at least one dimension to generate one or more folded convolution kernels corresponding to the original convolution kernel;
storing the one or more folded convolution kernels in the SRAM; and
reading the pre-processed folded feature data and the one or more folded convolution kernels from the SRAM into a calculation unit for convolving the pre-processed folded feature data with the one or more folded convolution kernels,
wherein the folding the unfolded feature data in at least one dimension comprises: performing a first folding on the unfolded feature data in a first dimension by splicing every $N_x$ consecutive slices in the first dimension in depth together, wherein the first dimension is one of width and height, and $N_x$ is an integer greater than 1, and
wherein data of all $C_x$ channels in the $(i_{fx} \times N_x + i_{fx})$th slice of the unfolded feature data in the first dimension correspond to data of all consecutive $C_x$ channels starting from the $(i_{fx} \times C_x)$th channel in the $(i_{fx})$th slice of the result of the first folding in the first dimension, where $i_{fx}$ is an integer greater than or equal to 0, $i_{fx}$ is an integer greater than or equal to 0 and less than $N_x$, and $C_x$ is an integer greater than 0.

18. A method for performing an operation of a convolutional layer in a convolutional neural network, comprising:
folding unfolded feature data provided to the convolution layer in at least one dimension of width and height to generate folded feature data;
pre-processing the folded feature data and an original convolution kernel of the convolution layer;
folding a pre-processed original convolution kernel in the at least one dimension to generate one or more folded convolution kernels corresponding to the original convolution kernel; and
convolving pre-processed folded feature data with the one or more folded convolution kernels,
wherein the folding the unfolded feature data in at least one dimension comprises: performing a first folding on the unfolded feature data in a first dimension by splicing every $N_x$ consecutive slices in the first dimension in depth together, wherein the first dimension is one of width and height, and $N_x$ is an integer greater than 1, and wherein data of all $C_x$ channels in the $(i_{fx} \times N_x + i_{fx})$th slice of the unfolded feature data in the first dimension correspond to data of all consecutive $C_x$ channels starting from the $(i_{fx} \times C_x)$th channel in the $(i_{fx})$th slice of the result of the first folding in the first dimension, where $i_{fx}$ is an integer greater than or equal to 0, $i_{fx}$ is an integer greater than or equal to 0 and less than and $C_x$ is an integer greater than 0.

\* \* \* \* \*